US010313612B2

(12) United States Patent
Li

(10) Patent No.: US 10,313,612 B2
(45) Date of Patent: Jun. 4, 2019

(54) IMAGE SENSOR, CONTROL METHOD, AND ELECTRONIC DEVICE

(71) Applicant: GUANGDONG OPPO MOBILE TELECOMMUNICATIONS CORP., LTD., Dongguan, Guangdong (CN)

(72) Inventor: Longjia Li, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/568,941

(22) PCT Filed: Dec. 16, 2016

(86) PCT No.: PCT/CN2016/110445
§ 371 (c)(1),
(2) Date: Oct. 24, 2017

(87) PCT Pub. No.: WO2017/101864
PCT Pub. Date: Jun. 22, 2017

(65) Prior Publication Data
US 2018/0124334 A1 May 3, 2018

(30) Foreign Application Priority Data

Dec. 18, 2015 (CN) .......................... 2015 1 0960708
Dec. 18, 2015 (CN) .......................... 2015 1 0963291
(Continued)

(51) Int. Cl.
H04N 5/355 (2011.01)
H04N 5/235 (2006.01)
(Continued)

(52) U.S. Cl.
CPC ............... *H04N 5/355* (2013.01); *H04N 5/04* (2013.01); *H04N 5/235* (2013.01);
(Continued)

(58) Field of Classification Search
CPC .......... H04N 5/355; H04N 5/374; H04N 5/04; H04N 5/378; H04N 5/265; H04N 5/353; H04N 5/23293
See application file for complete search history.

(56) References Cited

U.S. PATENT DOCUMENTS 7,956,925 B2    6/2011  Ogawa et al.
8,908,073 B2 * 12/2014  Minagawa ......... H04N 5/35563
                                              348/302
(Continued)

FOREIGN PATENT DOCUMENTS

CN    101057493 A    10/2007
CN    101064787 A    10/2007
(Continued)

OTHER PUBLICATIONS

EPO, Office Action for EP Application No. 16874921, dated Sep. 12, 2018.
(Continued)

Primary Examiner — Twyler L Haskins
Assistant Examiner — Angel L Garces-Rivera
(74) Attorney, Agent, or Firm — Hodgson Russ LLP

(57) ABSTRACT

An image sensor includes a light sensing array, a light filtering array, and a plurality of conversion units. The light sensing array includes a plurality of light sensing units. Each of the light sensing units includes a plurality of light sensing pixels. The light filtering array is disposed on the light sensing array. The light filtering array further includes a plurality of light filtering units. Each of the light filtering units correspondingly covers one of the light sensing units.
(Continued)

Each of the conversion units includes at least two source followers. At least one of the at least two source followers is connected to a plurality of the light sensing pixels. A control method configured to control the image sensor and an electronic device including the image sensor are also provided.

17 Claims, 9 Drawing Sheets

(30) Foreign Application Priority Data

Dec. 18, 2015 (CN) .......................... 2015 1 0963293
Dec. 18, 2015 (CN) .......................... 2015 1 0964086

(51) Int. Cl.
| | | |
|---|---|---|
| *H04N 9/07* | (2006.01) | |
| *H04N 5/04* | (2006.01) | |
| *H04N 5/265* | (2006.01) | |
| *H04N 5/353* | (2011.01) | |
| *H04N 5/374* | (2011.01) | |
| *H04N 5/378* | (2011.01) | |
| *H04N 5/3745* | (2011.01) | |
| *H04N 5/347* | (2011.01) | |
| *H04N 5/369* | (2011.01) | |
| *H04N 5/232* | (2006.01) | |

(52) U.S. Cl.
CPC ........... *H04N 5/2355* (2013.01); *H04N 5/265* (2013.01); *H04N 5/347* (2013.01); *H04N 5/353* (2013.01); *H04N 5/3696* (2013.01); *H04N 5/374* (2013.01); *H04N 5/378* (2013.01); *H04N 5/37457* (2013.01); *H04N 9/07* (2013.01); *H04N 5/23293* (2013.01)

(56) References Cited

U.S. PATENT DOCUMENTS

| | | |
|---|---|---|
| 9,131,201 B1 | 9/2015 | Geiss |
| 9,344,637 B2 | 5/2016 | Kasai et al. |
| 9,357,137 B2 | 5/2016 | Mitsunaga |
| 9,648,294 B2 | 5/2017 | Masuyama |
| 9,666,631 B2 | 5/2017 | Lyu et al. |
| 2004/0201760 A1 | 10/2004 | Ota et al. |
| 2006/0072024 A1 | 4/2006 | Ishihara et al. |
| 2009/0195683 A1 | 8/2009 | Honda et al. |
| 2009/0200451 A1 | 8/2009 | Conners |
| 2011/0180689 A1 | 7/2011 | Roy et al. |
| 2011/0273597 A1 | 11/2011 | Ishiwata |
| 2013/0242152 A1 | 9/2013 | Kasai |
| 2015/0124139 A1 | 5/2015 | Ishiwata et al. |
| 2016/0141326 A1 | 5/2016 | Hanzawa |
| 2016/0316165 A1 | 10/2016 | Li et al. |

FOREIGN PATENT DOCUMENTS

| | | |
|---|---|---|
| CN | 101651145 | 2/2010 |
| CN | 101931756 A | 12/2010 |
| CN | 103650480 A | 3/2014 |
| CN | 103686007 A | 3/2014 |
| CN | 103748868 A | 4/2014 |
| CN | 103780850 A | 5/2014 |
| CN | 103929600 A | 7/2014 |
| CN | 103957345 A | 7/2014 |
| CN | 104580945 A | 4/2015 |
| CN | 105097855 A | 11/2015 |
| CN | 105516695 A | 4/2016 |
| CN | 105554419 A | 5/2016 |
| CN | 105578074 A | 5/2016 |
| CN | 105611198 A | 5/2016 |
| JP | 2006049361 | 2/2006 |
| JP | 2009010862 | 1/2009 |
| JP | 2014212450 A | 11/2014 |
| JP | 2015128215 | 7/2015 |
| KR | 20150141127 | 12/2015 |
| WO | 2012049321 A1 | 4/2012 |
| WO | 2015111374 | 7/2015 |
| WO | 2015141161 A1 | 9/2015 |

OTHER PUBLICATIONS

EPO, Office Action for EP Application No. 16874921, dated Nov. 21, 2018.
Korean Intellectual Property Office, Notification of Reason for Refusal in Korean Patent Application No. 10-2018-7006361 by Guangdong Oppo Mobile Telecommunications Corp., Ltd. for Image Sensor, Control Method, and Electronic Device, Notification dated Apr. 10, 2019.

\* cited by examiner

IMAGE SENSOR, CONTROL METHOD, AND ELECTRONIC DEVICE

CROSS REFERENCE TO RELATED APPLICATIONS

This application claims the priority of International Application No. PCT/CN2016/110445 filed Dec. 16, 2016, which claims the priorities of Chinese Patent Applications No. 201510964086.4, 201510963291.9, 201510963293.8, and 201510960708.6, filed Dec. 18, 2015. The entire disclosures of the above applications are incorporated herein by reference.

BACKGROUND

Field

The present disclosure relates to imaging technique, and more particularly to an image sensor, a control method, and an electronic device.

Background

As mobile phones are becoming more and more popular, more and more people are interested in taking photos using the mobile phones. However, people are placing more demands in taking the photos. Good quality low-light photos have become an urgent demand of consumers, and thus sensors require a higher sensitivity and a better signal-to-noise ratio. However, the sensitivity and the signal-to-noise ratio of current image sensors need to be improved further.

SUMMARY OF THE DISCLOSURE

The present disclosure is intended to solve at least one of the technical problems in the related art to a certain extent. To this end, the present disclosure requires providing an image sensor, a control method, and an electronic device.

An image sensor in accordance with an embodiment of the present disclosure includes:

A light sensing array including a plurality of light sensing units, wherein each of the light sensing units includes a plurality of light sensing pixels; a light filtering array disposed on the light sensing array, wherein the light filtering array includes a plurality of light filtering units, and each of the light filtering units correspondingly covers one of the light sensing units; and a plurality of conversion units, wherein each of the conversion units includes at least two source followers, and at least one of the at least two source followers is connected to a plurality of the light sensing pixels.

In some embodiments, each of the light sensing units includes 2×2 light sensing pixels.

In some embodiments, each of the conversion units includes two source followers, one of the source followers is connected to two of the light sensing pixels in a first row, and the other one of the source followers is connected to two of the light sensing pixels in a second row.

In some embodiments, the image sensor further includes a plurality of analog-to-digital conversion units, and one of the analog-to-digital conversion units is connected to the two source followers.

In some embodiments, the image sensor further includes:

A plurality of clock switches, wherein each of the clock switches is connected to one of the light sensing pixels;

A plurality of reset switches, wherein the two of the light sensing pixels in the first row is connected to one of the reset switches, and the two of the light sensing pixels in the second row is connected to the other one of the reset switches; and A plurality of readout switches, wherein each of the readout switches is connected to one of the source followers.

In some embodiments, each of the conversion units includes two source followers, one of the source followers is connected to three of the light sensing pixels, and the other one of the source followers is connected to a remaining one of the light sensing pixels.

In some embodiments, the image sensor further includes a plurality of analog-to-digital conversion units, and each of the analog-to-digital conversion units is connected to one of the source followers.

In some embodiments, the image sensor further includes:

A plurality of clock switches, wherein each of the clock switches is connected to one of the light sensing pixels;

A plurality of reset switches, wherein the three of the light sensing pixels to which the one of the source followers is connected are connected to one of the reset switches, and the remaining one of the light sensing pixels to which the other one of the source followers is connected is connected to the other one of the reset switches; and A plurality of readout switches, wherein the one of the source followers connected to the three of the light sensing pixels is connected to one of the readout switches, and the other one of the source followers connected to the remaining one of the light sensing pixels is connected to the other one of the readout switches.

In some embodiments, each of the conversion units includes three source followers, one of the source followers is connected to two of the light sensing pixels in one column, and the other two of the source followers are respectively connected to remaining two of the light sensing pixels.

In some embodiments, the image sensor of further includes a plurality of analog-to-digital conversion units, the source follower connected to the two of the light sensing unit in the one column is connected to one of the analog-to-digital conversion units, and the two source follower respectively connected to the remaining two of the light sensing units are connected to the other one of the analog-to-digital conversion units.

In some embodiments, the image sensor further includes:

A plurality of clock switches, wherein each of the clock switches is connected to one of the light sensing pixels;

A plurality of reset switches, wherein the two of the light sensing pixels in the one column to which the one of the source followers is connected are connected to one of the reset switches, and the remaining two of the light sensing pixels are connected to respective ones of the reset switches; and A plurality of readout switches, wherein the one of the source followers connected to the two of the light sensing pixels in the one column is connected to one of the readout switches, and the other two of the source followers respectively connected to the remaining two of the light sensing pixels is connected to the other one of the readout switches.

In some embodiments, each of the conversion units includes three source followers, one of the source followers is connected to two of the light sensing pixels in one row, and the other two of the source followers are respectively connected to remaining two of the light sensing pixels.

In some embodiments, the image sensor further includes a plurality of analog-to-digital conversion units, and one of the analog-to-digital conversion units is connected to the three source followers.

In some embodiments, the image sensor further includes:

A plurality of clock switches, wherein each of the clock switches is connected to one of the light sensing pixels;

A plurality of reset switches, wherein the two of the light sensing pixels in the one row to which the one of the source followers is connected are connected to one of the reset switches, and the other two of the light sensing pixels are connected to respective ones of the reset switches; and A plurality of readout switches, wherein the one of the source followers connected to the two of the light sensing pixels in the one row is connected to one of the readout switches, and the other two of the source followers connected to the other two of the light sensing pixels is connected to the other one of the readout switches.

A control method in accordance with an embodiment of the present disclosure is configured to control an image sensor. The image sensor includes a light sensing array, a light filtering array, and a plurality of conversion units. The light sensing array includes a plurality of light sensing units. Each of the light sensing units includes a plurality of light sensing pixels. The light filtering array is disposed on the light sensing array. The light filtering array includes a plurality of light filtering units. Each of the light filtering units correspondingly covers one of light sensing units. Each of the conversion units includes at least two source followers. At least one of the at least two source followers is connected to a plurality of the light sensing pixels. The image sensor further includes a plurality of clock switches configured to control the light sensing pixels to be exposed, a plurality of reset switches configured to reset the light sensing pixels, and a plurality of readout switches configured to control readouts of the light sensing pixels. The control method includes:

Controlling the clock switches, the reset switches, and the readout switches to read two image frames; and Synthesizing the two image frames to acquire a high dynamic range image.

In some embodiments, controlling the clock switches, the reset switches, and the readout switches to read the two image frames includes:

Controlling the reset switches to reset the light sensing pixels;

Controlling the clock switches, so that two adjacent rows of the light sensing pixels are exposed synchronously; and Controlling timing sequences of the readout switches to read an output of each of the source followers to read the two image frames.

In some embodiments, controlling the clock switches, the reset switches, and the readout switches to read the two image frames includes:

Converting analog signals outputted by the source followers into digital signals.

An electronic device in accordance with an embodiment of the present disclosure includes an image sensor. The image sensor includes a light sensing array including a plurality of light sensing units, wherein each of the light sensing units includes a plurality of light sensing pixels; a light filtering array disposed on the light sensing array, wherein the light filtering array includes a plurality of light filtering units, and each of the light filtering units correspondingly covers one of the light sensing units; a micromirror array disposed on the light filtering array and includes a plurality of micromirrors, wherein each of the micromirrors corresponds to one of the light sensing pixels; and a plurality of conversion units, wherein each of the conversion units includes at least two source followers, and at least one of the at least two source followers is connected to a plurality of the light sensing pixels.

In some embodiments, the electronic device further includes a central processing unit connected to the image sensor and an external storage device, and the central processing unit is configured to control the external storage device to store an image outputted by the image sensor.

In some embodiments, the electronic device further includes a central processing unit connected to the image sensor and a display device. The central processing unit is configured to control the display device to display an image outputted by the image sensor.

In the image sensor, the control method, and the electronic device in accordance with the embodiments of the present disclosure, since each of the filtering units correspond to a plurality of the light sensing pixels and at least one of the source followers is connected to multiple light sensing pixels, the multiple light sensing pixels can obtain more photoinduced charges when compared to an output of one light sensing pixel. Accordingly, by improving hardware, sensitivity and a signal-to-noise ratio can be increased, and outputs and readouts by controlling exposure of the light sensing pixels can synthesize a high dynamic range image.

Additional aspects and advantages of the present disclosure will be given in the following description, and some will become apparent from the following description or learned by practice of the present disclosure.

DETAILED DESCRIPTION OF THE ILLUSTRATED EMBODIMENTS

Figures 1, 2:
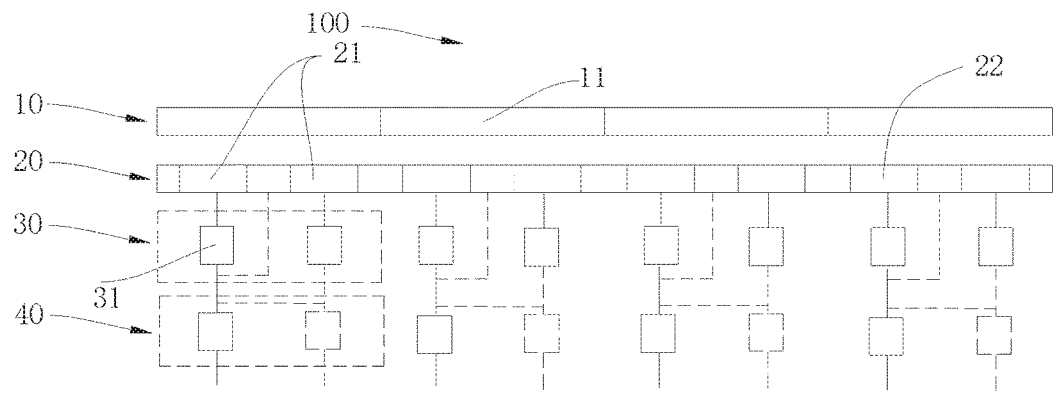
FIG. 1 illustrates an image sensor in accordance with an embodiment of the present disclosure.
FIG. 2 illustrates a light filtering array in accordance with an embodiment of the present disclosure.

Hereinafter, exemplary embodiments of the present disclosure will be described with reference to the accompanying drawings. The same or similar elements or the elements with the same or similar functions will be designated by the same or similar reference numerals all through the following description and drawings. The following embodiments described with the accompanying drawings are merely exemplary to explain the present disclosure and not to be construed as limiting the present disclosure.

Please refer to FIG. 1. An image sensor 100 in accordance with an embodiment of the present disclosure includes a light filtering array 10, a light sensing array 20, and a plurality of conversion units 30.

The light filtering array 10 includes a plurality of light filtering units 11. The light filtering array 10 is disposed on the light sensing array 20. The light sensing array 20 includes a plurality of light sensing units 21. Each of the light sensing units 21 includes a plurality of light sensing pixels 22. Each of the light filtering units 11 correspondingly covers one of the light sensing units 21. That is, each of the light filtering units 11 correspondingly covers multiple light sensing pixels 22. Each of the conversion units 30 includes at least two source followers 31. At least one of the source followers 31 is connected to multiple light sensing pixels 22. The source followers 31 are configured to convert light generated by the light sensing pixels 22 into analog signals.

It may be understood that since at least one of the source followers 31 is connected to multiple light sensing pixels 22, photoinduced charges generated by the multiple light sensing pixels 22 corresponding to the same light filtering unit 11 output a plurality sets of analog signals according to a number of the source followers 31 and different connections. Compared to an output of one light sensing pixel 22, the multiple light sensing pixels 22 can obtain more photoinduced charges. Accordingly, by improving hardware, sensitivity and a signal-to-noise ratio can be increased, and outputs and readouts by controlling exposure of multiple light sensing pixels 22 can synthesize a high dynamic range image.

In some embodiments, the image sensor 100 includes a complementary metal oxide semiconductor (CMOS) image sensor.

Please refer to FIG. 2. The light filtering array 10 includes a Bayer array. The light filtering units 11 having the same color are represented by the same character, for example, Gr, Gb, R, or B. A numeral after the character represents a sequential number corresponding to a light sensing pixel 22 of the light filtering units 11 having the same color. The light filtering units 11 having different colors allow light, having corresponding wavelengths, to pass.

In some embodiments, the light sensing pixel 22 corresponding to each of the light filtering units 11 are positioned in different rows.

For example, in some embodiments, each of the light sensing units 21 includes 2×2 light sensing pixels 22. That is, each of the light filtering units 11 correspondingly covers four light sensing pixels 22 in two rows and two columns.

Figure 3:
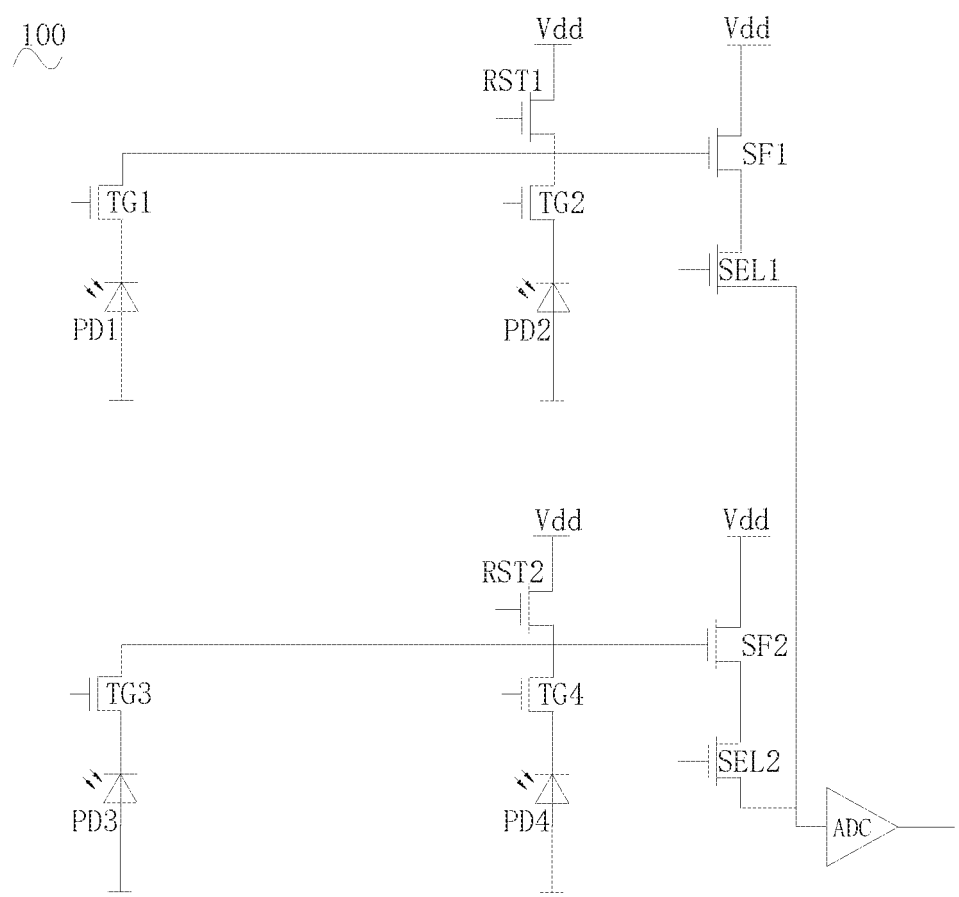
FIG. 3 illustrates a circuit diagram of the image sensor in accordance with some embodiments of the present disclosure.

Please refer to FIG. 3. In some embodiments, each of the conversion units 30 includes two source followers 31. One of the source followers 31 is connected to two light sensing pixels 22 in a first row. The other one of the source followers 31 is connected to two light sensing pixels 22 in a second row.

As such, the photoinduced charges generated by the two light sensing pixels 22 in the first row are accumulated and converted into a first analog signal A1 by one of the source followers 31. The photoinduced charges generated by the two light sensing pixels 22 in the second row are accumulated and converted into a second analog signal A2 by the other one of the source followers 31.

Further, the image sensor 100 further includes a plurality of analog-to-digital conversion units 40. Each of the analog-to-digital conversion units 40 is connected to two source followers 31. Each of the analog-to-digital conversion units 40 is configured to convert the analog signals outputted by the source followers 31 into digital signals. In detail, in the present embodiment, the first analog signal A1 and the second analog signal A2 are respectively converted into a first digital signal D1 and a second digital signal D2 by one of the analog-to-digital conversion units 40.

Further, the image sensor 100 further includes a plurality of clock switches, a plurality of reset switches, and a plurality of readout switches. The clock switches are configured to control the light sensing pixels 22 to be exposed. The reset switches are configured to reset the light sensing pixels 22. The readout switches are configured to control readouts of the light sensing pixels 22.

An equivalent circuit of one of the light sensing units 21 of the image sensor 100 is described as follows. The one of the light sensing units 21 includes light sensing pixels PD1-PD4, clock switches TG1-TG4, source followers SF1 and SF2, reset switches RST1 and RST2, and readout switches SEL1 and SEL2.

In detail, the light sensing pixels PD1-PD4 are arranged in a 2×2 array. The first light sensing pixel PD1, the second light sensing pixel PD2, the third light sensing pixel PD3, and the fourth light sensing pixel PD4 are adjacent light sensing pixels and correspond to the same light filtering unit 11. That is, the four adjacent light sensing pixels receive the same color of light. In brief, the four light sensing pixels constitute a large pixel. The first light sensing pixel PD1 and the second light sensing pixel PD2 are positioned in the same row, and the third light sensing pixel PD3 and the fourth light sensing pixel PD4 are positioned in the same row. Each of the light sensing pixels is connected to one of the clock switches. That is, the first light sensing pixel PD1 is connected to the first clock switch TG1. The second light sensing pixel PD2 is connected to the second clock switch TG2. The third light sensing pixel PD3 is connected to the third clock switch TG3. The fourth light sensing pixel PD4 is connected to the fourth clock switch TG4.

Further, in the first row, the first light sensing pixel PD1 is connected to a first terminal of the source follower SF1 via the first clock switch TG1, and the second light sensing pixel PD2 is connected to the first terminal of the source follower SF1 via the second clock switch TG2. The first light sensing pixel PD1 is connected to a first terminal of the reset switch RST1 via the first clock switch TG1, and the second light sensing pixel PD2 is connected to the first terminal of the reset switch RST1 via the second clock switch TG2. A second terminal of the reset switch RST1 and a second terminal of the source follower SF1 are connected to a predetermined power source, e.g., Vdd. A third terminal of the source follower SF1 is connected to a first terminal of the readout switch SEL1.

Further, in the second row, connections of the third light sensing pixel PD3, the fourth light sensing pixel PD4, the corresponding clock switches TG3 and TG4, the reset switch RST2, the source follower SF2, and the readout switch SEL2 are similar to the connections of the first light sensing pixel PD1, the second light sensing pixel PD2, the corresponding clock switches TG1 and TG2, the reset switch RST1, the source follower SF1, and the readout switch SEL1 in the first row, and not repeated herein.

Further, second terminals of the readout switches SEL1 and SEL2 are connected to one of the analog-to-digital conversion units 40.

In order to implement control of an exposure, the image sensor 100 further includes a control module. Control terminals of the first clock switch TG1, the second clock switch TG2, the third clock switch TG3, and the fourth clock switch TG4 are connected to the control module. The control module controls turned-on and turned-off of the four clock switches. When each of the four clock switches is turned on, the corresponding light sensing pixel starts to be exposed.

It is noted that before being exposed, the light sensing pixels have to be reset. That is, control terminals of the reset switches RST1 and RST2 are also connected to the control module and configured to reset the corresponding light sensing pixels before the corresponding light sensing pixels are exposed or after exposing data is read.

During an exposure process, the first to fourth light sensing pixels PD1-PD4, for example, photodiodes, receive the light passing through the corresponding one of the light filtering units and generate charge. The clock switches TG1-TG4 are turned on, and the charges generated by the corresponding light sensing pixels are outputted. The charges are converted into analog signals by the source followers SF1 and SF2, and the analog signals are converted into digital signals by the corresponding one of the analog-to-digital conversion units. The digital signals are outputted for providing a data basis of image processing.

The control module controls the light sensing pixels 22 corresponding to the same one of the light filtering units 11 to be exposed synchronously row by row, and controls exposing time, so as to implement the control of the exposure.

As an example, two light sensing pixels corresponding to each of the light filtering units 11 in the (2i+1)th row (i=0, 1, 2, 3, 4, . . . ) of the light sensing array 20 (e.g., the light sensing pixels corresponding to the light filtering units Gr1 and Gr2), that is, the first light sensing pixel PD1 and the second light sensing pixel PD2 share the source follower SF1. The charges generated by the first light sensing pixel PD1 and the second light sensing pixel PD2 are collected, and the collected charges are converted into the analog signals by the source follower SF1. The analog signals are converted into the digital signals by the analog-to-digital conversion unit 40 and outputted. It is assumed that an output value of the analog-to-digital conversion unit 40 is ADC1. Further, two light sensing pixels corresponding to each of the light filtering units 11 in the (2i+2)th row (i=0, 1, 2, 3, 4, . . . ) of the light sensing array 20 adjacent to the (2i+1)th row (e.g., the light sensing pixels corresponding to the light filtering units Gr3 and Gr4), that is, the third light sensing pixel PD3 and the fourth light sensing pixel PD4 share the source follower SF2. The charges generated by the third light sensing pixel PD3 and the fourth light sensing pixel PD4 are collected, and the collected charged are converted into the analog signals by the source follower SF2. The analog signals are converted into the digital signals by the analog-to-digital conversion unit 40 and outputted. It is assumed that an output value of the analog-to-digital conversion unit 40 is ADC2.

When a photo is taken, the control module controls two adjacent rows of the light sensing units to be exposed synchronously. For example, the (2i+1)th and the (2i+2)th rows (i=0, 1, 2, 3, 4, . . . ) of the light sensing units are exposed synchronously. The exposing time is controlled to avoid that the two light sensing units 22 sharing the same source follower have saturation outputs. In the embodiment of the present disclosure, each source follower 31 can collect the charges by the two light sensing units 22 that are connected to the source follower 31. It can be understood that the charge amount collected by or the analog signals converted by the source follower SF1 or the source follower SF2 is a sum of the charges generated by the two corresponding light sensing units 22 and approximately double of the charges generated by one of the two light sensing units 22. After the readout switches SEL1 and SEL2 are controlled to be turned on simultaneously, an output value of the analog-to-digital conversion unit 40 is an average value of the values outputted by the source followers SF1 and SF2. That is, compared to one light sensing unit 22, the charges generated by the four light sensing units 22 corresponding to the same one of the light filtering units 11 are increasing, thereby improving the sensitivity of the image sensor 100 (approximately double).

Figure 4:
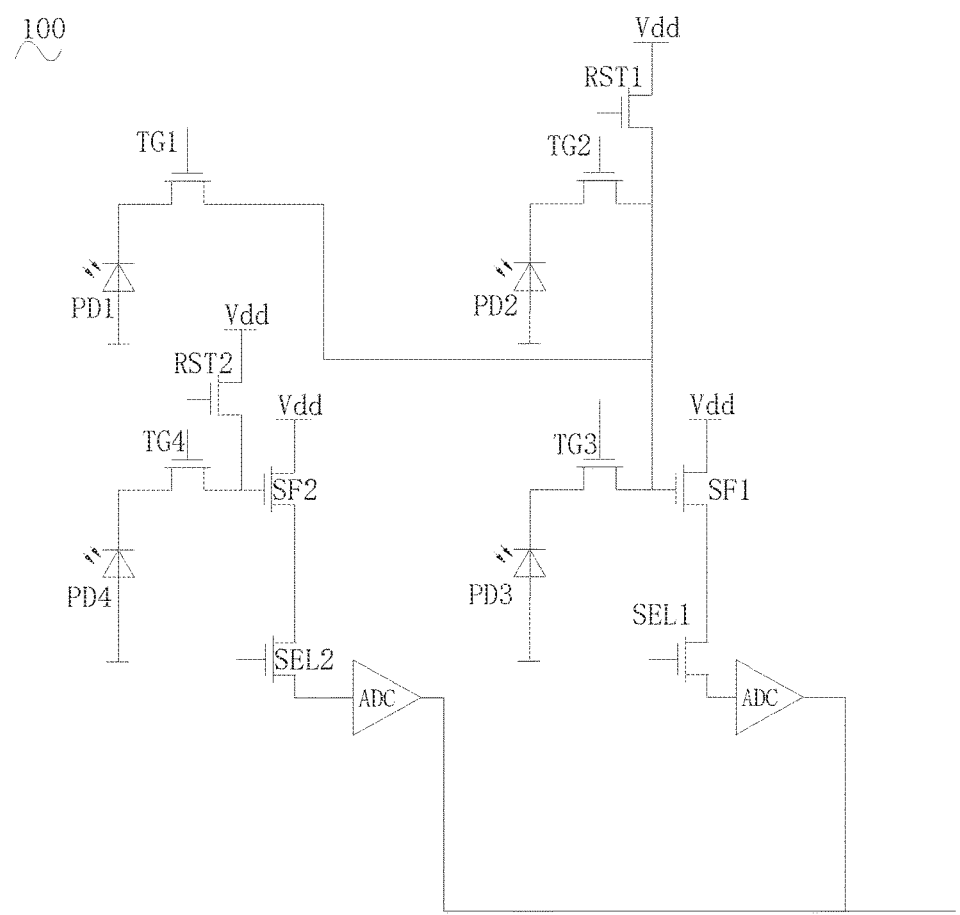
FIG. 4 illustrates a circuit diagram of the image sensor in accordance with some embodiments of the present disclosure.

Please refer to FIG. 4. In some embodiments, each of the conversion units 30 includes two source followers 31. One of the source followers 31 is connected to three light sensing pixels 22 of one of the light sensing units 21. The other one of the source followers 31 is connected to a remaining one light sensing pixel 22 of the one of the light sensing units 21.

For example, photoinduced charges generated by the three light sensing pixels 22 including two light sensing pixels 22 in a first row and a light sensing pixel 22 in a second row are accumulated and converted into a first analog signal A1 by one of the source followers 31. Photoinduced charges generated by the other one of the light sensing pixels 22 in the second row are accumulated and converted into a second analog signal A2 by the other one of the source followers 31.

Further, the image sensor 100 further includes a plurality of analog-to-digital conversion units 40. Each of the analog-to-digital conversion units 40 is connected to one of the source followers 31. That is, each of the light sensing units 21 is connected to two analog-to-digital conversion units 40. Each of the analog-to-digital conversion units 40 is configured to convert the analog signals outputted by the source followers 31 into digital signals. In detail, in the present embodiment, the first analog signal A1 is converted into a first digital signal D1 by one of the analog-to-digital conversion units 40, and the second analog signal A2 is converted into a second digital signal D2 by the other one of the analog-to-digital conversion units 40.

Further, the image sensor 100 further includes a plurality of clock switches, a plurality of reset switches, and a plurality of readout switches. The clock switches are configured to control the light sensing pixels 22 to be exposed. The reset switches are configured to reset the light sensing pixels 22. The readout switches are configured to control readouts of the light sensing pixels 22.

An equivalent circuit of one of the light sensing units 21 of the image sensor 100 is described as follows. The one of the light sensing units 21 includes light sensing pixels PD1-PD4, clock switches TG1-TG4, source followers SF1 and SF2, reset switches RST1 and RST2, and readout switches SEL1 and SEL2.

In detail, the light sensing pixels PD1-PD4 are arranged in a 2×2 array. The first light sensing pixel PD1, the second light sensing pixel PD2, the third light sensing pixel PD3, and the fourth light sensing pixel PD4 are adjacent light sensing pixels and correspond to the same light filtering unit 11. That is, the four adjacent light sensing pixels receive the same color of light. In brief, the four light sensing pixels constitute a large pixel. The first light sensing pixel PD1 and the second light sensing pixel PD2 are in the same row, and the third light sensing pixel PD3 and the fourth light sensing pixel PD4 are in the same row. Each of the light sensing pixels is connected to one of the clock switches. That is, the first light sensing pixel PD1 is connected to the first clock switch TG1. The second light sensing pixel PD2 is connected to the second clock switch TG2. The third light sensing pixel PD3 is connected to the third clock switch TG3. The fourth light sensing pixel PD4 is connected to the fourth clock switch TG4.

Further, the first light sensing pixel PD1 is connected to a first terminal of the source follower SF1 via the first clock switch TG1, the second light sensing pixel PD2 is connected to the first terminal of the source follower SF1 via the second clock switch TG2, and the third light sensing pixel PD3 is connected to the first terminal of the source follower SF1 via the third clock switch TG3. The first light sensing pixel PD1 is connected to a first terminal of the reset switch RST1 via the first clock switch TG1, the second light sensing pixel PD2 is connected to the first terminal of the reset switch RST1 via the second clock switch TG2, and the third light sensing pixel PD3 is connected to the first terminal of the reset switch RST1 via the third clock switch TG3. A second terminal of the reset switch RST1 and a second terminal of the source follower SF1 are connected to a predetermined power source, e.g., Vdd. A third terminal of the source follower SF1 is connected to a first terminal of the readout switch SEL1.

Further, the fourth light sensing pixel PD4 is connected to first terminals of the source follower SF2 and the reset switch RST2 via the fourth clock switch TG4. Second terminals of the source follower SF2 and the reset switch RST2 are connected to the predetermined power source. A third terminal of the source follower SF2 is connected to a first terminal of the readout switch SEL2.

Further, second terminals of the readout switches SEL1 and SEL2 are respectively connected to one of the analog-to-digital conversion units 40.

In order to implement control of an exposure, the image sensor 100 further includes a control module. Control terminals of the first clock switch TG1, the second clock switch TG2, the third clock switch TG3, and the fourth clock switch TG4 are connected to the control module. The control module controls turned-on and turned-off of the four clock switches. When each of the four clock switches is turned on, the corresponding light sensing pixel starts to be exposed.

It is noted that before being exposed, the light sensing pixels have to be reset. That is, control terminals of the reset switches RST1 and RST2 are also connected to the control module and configured to reset the corresponding light sensing pixels before the corresponding light sensing pixels are exposed or after exposing data is read.

During an exposure process, the first to fourth light sensing pixels PD1-PD4, for example, photodiodes, receive the light passing through the corresponding one of the light filtering units and generate charge. The clock switches TG1-TG4 are turned on, and the charges generated by the corresponding light sensing pixels are outputted. The charges are converted into analog signals by the source followers SF1 and SF2, and the analog signals are converted into digital signals by the corresponding analog-to-digital conversion units. The digital signals are outputted for providing a data basis of image processing.

The control module controls the light sensing pixels 22 corresponding to the same one of the light filtering units 11 to be exposed synchronously row by row, and controls exposing time, so as to implement the control of the exposure. Further, the control module further controls outputs of the light sensing pixels to be read out in a time-sharing manner, thereby acquiring source material for synthesizing a high dynamic range image.

As an example, three light sensing pixels corresponding to each of the light filtering units 11 in the (2i+1)th row (i=0, 1, 2, 3, 4, . . . ) of the light sensing array 20 and the (2i+2)th row adjacent to the (2i+1)th row (e.g., the light sensing pixels corresponding to the light filtering units Gr1, Gr2, and Gr4), that is, the first light sensing pixel PD1, the second light sensing pixel PD2, and the third light sensing pixel PD3 share the source follower SF1. The charges generated by the first light sensing pixel PD1, the second light sensing pixel PD2, and the third light sensing pixel PD3 are collected, and the collected charges are converted into the analog signals by the source follower SF1. The analog signals are converted into the digital signals by one of the analog-to-digital conversion units 40 and outputted. It is assumed that an output value of the one of the analog-to-digital conversion units 40 is ADC1. Further, an output of the light sensing pixel corresponding to each of the light filtering units 11 adjacent to in the (2i+2)th row of the light sensing array 20 (e.g., the light sensing pixel corresponding to the light filtering unit Gr3), that is, the output of the fourth light sensing pixel PD4, is converted into analog signals by the source follower SF2. The analog signals are converted into digital signals by the other one of the analog-to-digital conversion units 40 and outputted. It is assumed that an output value of the other one of the analog-to-digital conversion units 40 is ADC2.

When a photo is taken, the control module controls two adjacent rows of the light sensing units to be exposed synchronously. For example, the (2i+1)th and the (2i+2)th rows (i=0, 1, 2, 3, 4, . . . ) of the light sensing units are exposed synchronously. The exposing time is controlled to avoid that the light sensing units 22 sharing the same source follower have saturation outputs. In the embodiment of the present disclosure, an output of the source follower SF1 is three times of an output of the source follower SF2. That is, the four light sensing units 22 corresponding to the same light filtering unit 11 can output a high ADC value and a low ADC value synchronously. After the readout switches SEL1 and SEL2 are controlled to be turned on in a timesharing manner, output values of the two analog-to-digital conversion units 40 are SF1 (SF1=3*SF2) and SF2, thereby performing a synthetic processing using an image processor to acquire a high dynamic range image. That is, based on hardware structure of the image sensor 100, the high output and the low output of the two analog-to-digital conversion units provide conditions for the synthesis of the high dynamic range image.

Figure 5:
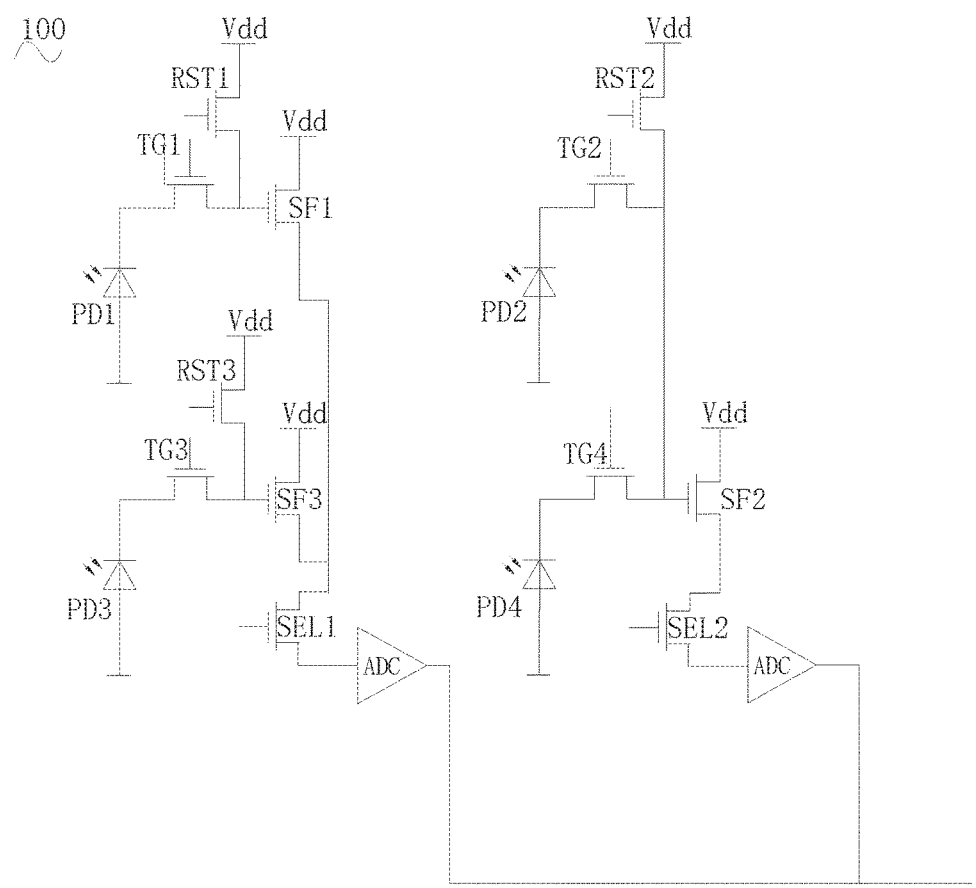
FIG. 5 illustrates a circuit diagram of the image sensor in accordance with some embodiments of the present disclosure.

Please refer to FIG. 5. In some embodiments, each of the conversion units 30 includes three source followers 31. One of the source followers 31 is connected to two light sensing pixels 22 in one column of one of the light sensing units 21. The other two of the source followers 31 are respectively connected to remaining two light sensing pixels 22 of the one of the light sensing units 21.

For example, photoinduced charges generated by the two light sensing pixels 22 in a first column are outputted by the other two of the source followers 31 and merged as a first analog signal A1. Photoinduced charges generated by the two light sensing pixels 22 in a second column are accumulated and converted into a second analog signal A2 by the one of the source followers 31.

Further, the image sensor 100 further includes a plurality of analog-to-digital conversion units 40. The one of the source followers 31 connected to the two light sensing units 21 in the same column is connected to one of the analog-to-digital conversion units 40. The other two of the source followers 31 respectively connected to the remaining two light sensing units 21 are connected to the other one of the analog-to-digital conversion units 40. That is, each light sensing unit 21 is connected to two analog-to-digital conversion units 40. Each of the analog-to-digital conversion units 40 is configured to convert analog signals outputted by the source followers 31 into digital signals. In detail, in the present embodiment, the first analog signal A1 is converted into a first digital signal D1 by one of the analog-to-digital conversion units 40, and the second analog signal A2 is converted into a second digital signal D2 by the other one of the analog-to-digital conversion units 40.

Further, the image sensor 100 further includes a plurality of clock switches, a plurality of reset switches, and a plurality of readout switches. The clock switches are configured to control the light sensing pixels 22 to be exposed. The reset switches are configured to reset the light sensing pixels 22. The readout switches are configured to control readouts of the light sensing pixels 22.

An equivalent circuit of one of the light sensing units 21 of the image sensor 100 is described as follows. The one of the light sensing units 21 includes light sensing pixels PD1-PD4, clock switches TG1-TG4, source followers SF1-SF3, reset switches RST1-RST3, and readout switches SEL1 and SEL2.

In detail, the light sensing pixels PD1-PD4 are arranged in a 2×2 array. The first light sensing pixel PD1, the second light sensing pixel PD2, the third light sensing pixel PD3, and the fourth light sensing pixel PD4 are adjacent light sensing pixels and correspond to the same light filtering unit 11. That is, the four adjacent light sensing pixels receive the same color of light. In brief, the four light sensing pixels constitute a large pixel. The first light sensing pixel PD1 and the second light sensing pixel PD2 are positioned in the same row, and the third light sensing pixel PD3 and the fourth light sensing pixel PD4 are positioned in the same row. Each of the light sensing pixels is connected to one of the clock switches. That is, the first light sensing pixel PD1 is connected to the first clock switch TG1. The second light sensing pixel PD2 is connected to the second clock switch TG2. The third light sensing pixel PD3 is connected to the third clock switch TG3. The fourth light sensing pixel PD4 is connected to the fourth clock switch TG4.

Further, the second light sensing pixel PD2 is connected to a first terminal of the source follower SF2 via the second clock switch TG2, and the fourth light sensing pixel PD4 is connected to the first terminal of the source follower SF2 via the fourth clock switch TG4. The second light sensing pixel PD2 is connected to a first terminal of the reset switch RST2 via the second clock switch TG2, and the fourth light sensing pixel PD4 is connected to the first terminal of the reset switch RST2 via the fourth clock switch TG4. A second terminal of the reset switch RST2 and a second terminal of the source follower SF2 are connected to a predetermined power source, e.g., Vdd. A third terminal of the source follower SF2 is connected to a first terminal of the readout switch SEL2.

Further, the first light sensing pixel PD1 is connected to a first terminal of the source follower SF1 via the first clock switch TG1, and the third light sensing pixel PD3 is connected to a first terminal of the source follower SF3 via the third clock switch TG3. The first light sensing pixel PD1 is connected to a first terminal of the reset switch RST1 via the first clock switch TG1, and the third light sensing pixel PD3 is connected to a first terminal of the reset switch RST3 via the third clock switch TG3. Second terminals of the source follower SF1, the source follower SF3, the reset switch RST1, and the reset switch RST3 are connected to the predetermined power source. Third terminals of the source follower SF1 and the source follower SF3 are connected to a first terminal of the readout switch SEL1.

Further, each of second terminals of the readout switches SEL1 and SEL2 is connected to one of the analog-to-digital conversion units 40.

In order to implement control of an exposure, the image sensor 100 further includes a control module. Control terminals of the first clock switch TG1, the second clock switch TG2, the third clock switch TG3, and the fourth clock switch TG4 are connected to the control module. The control module controls turned-on and turned-off of the four clock switches. When each of the four clock switches is turned on, the corresponding light sensing pixel starts to be exposed.

It is noted that before being exposed, the light sensing pixels have to be reset. That is, control terminals of the reset switches RST1, RST2, and RST3 are also connected to the control module and configured to reset the corresponding light sensing pixels before the corresponding light sensing pixels are exposed or after exposing data is read.

During an exposure process, the first to fourth light sensing pixels PD1-PD4, for example, photodiodes, receive the light passing through the corresponding one of the light filtering units and generate charge. The clock switches TG1-TG4 are turned on, and the charges generated by the corresponding light sensing pixels are outputted. The charges are converted into analog signals by the source followers SF1-SF3, and the analog signals are converted into digital signals by the corresponding analog-to-digital conversion units. The digital signals are outputted for providing a data basis of image processing.

The control module controls the light sensing pixels 22 corresponding to the same one of the light filtering units 11 to be exposed synchronously row by row, and controls exposing time, so as to implement the control of the exposure. Further, the control module further controls outputs of the light sensing pixels to be read out in a time-sharing manner, thereby acquiring source material for synthesizing a high dynamic range image.

As an example, charges of one light sensing pixel (i.e., the first light sensing pixel PD1 corresponding to the light filtering unit G0) in the (2i+1)th row (i=0, 1, 2, 3, 4, . . . ) of the light sensing array 20 and charges of one light sensing pixel (i.e., the third light sensing pixel PD3 corresponding to the light filtering unit Gr3) in the (2i+2)th row adjacent to the (2i+1)th row in each of the light filtering units 11 are respectively converted by the source followers SF1 and SF3. Outputs of the source followers SF1 and SF3 are converted into digital signals by one of the analog-to-digital conversion units 40 and outputted. It is assumed that an output value of the one of the analog-to-digital conversion units 40 is ADC1. Further, charges generated by one light sensing pixel (i.e., the second light sensing pixel PD2 corresponding to the light filtering unit Gr2) in the (2i+1)th row of the light sensing array 20 and charges generated by one light sensing pixel (i.e., the fourth light sensing pixel PD4 corresponding to the light filtering unit Gr4) in the (2i+2)th row in the same column of each of the light filtering units 11 are collected and converted by the source follower SF2. An output of the source follower SF2 is converted into digital signals by the other one of the analog-to-digital conversion units 40 and outputted. It is assumed that an output value of the other one of the analog-to-digital conversion units 40 is ADC2.

When a photo is taken, the control module controls two adjacent rows of the light sensing units to be exposed synchronously. For example, the (2i+1)th and the (2i+2)th rows (i=0, 1, 2, 3, 4, . . . ) of the light sensing units are exposed synchronously. The exposing time is controlled to avoid that the light sensing units 22 sharing the same source follower have saturation outputs. In the embodiment of the present disclosure, an output of the source follower SF2 is approximately two times of an output of the source follower SF1 and two times of an output of the source follower SF3 (that is, SF2=2*SF1=2*SF3). The output value ADC1 is an average value of the outputs of the source followers SF1 and SF3, and the output value ADC2 is the output of the source follower SF2. That is, the four light sensing units 22 corresponding to the same light filtering unit 11 can output a high ADC value and a low ADC value synchronously. After the readout switches SEL1 and SEL2 are controlled to be turned on in a timesharing manner, the output values of the two analog-to-digital conversion units 40 are ADC1 ($AVG_{SF1+SF3}$) and ADC2 (SF2=2*SF1=2*SF2), thereby performing a synthetic processing using an image processor to acquire a high dynamic range image. That is, based on hardware structure of the image sensor 100, the high output and the low output of the two analog-to-digital conversion units provide conditions for the synthesis of the high dynamic range image.

Figure 6:
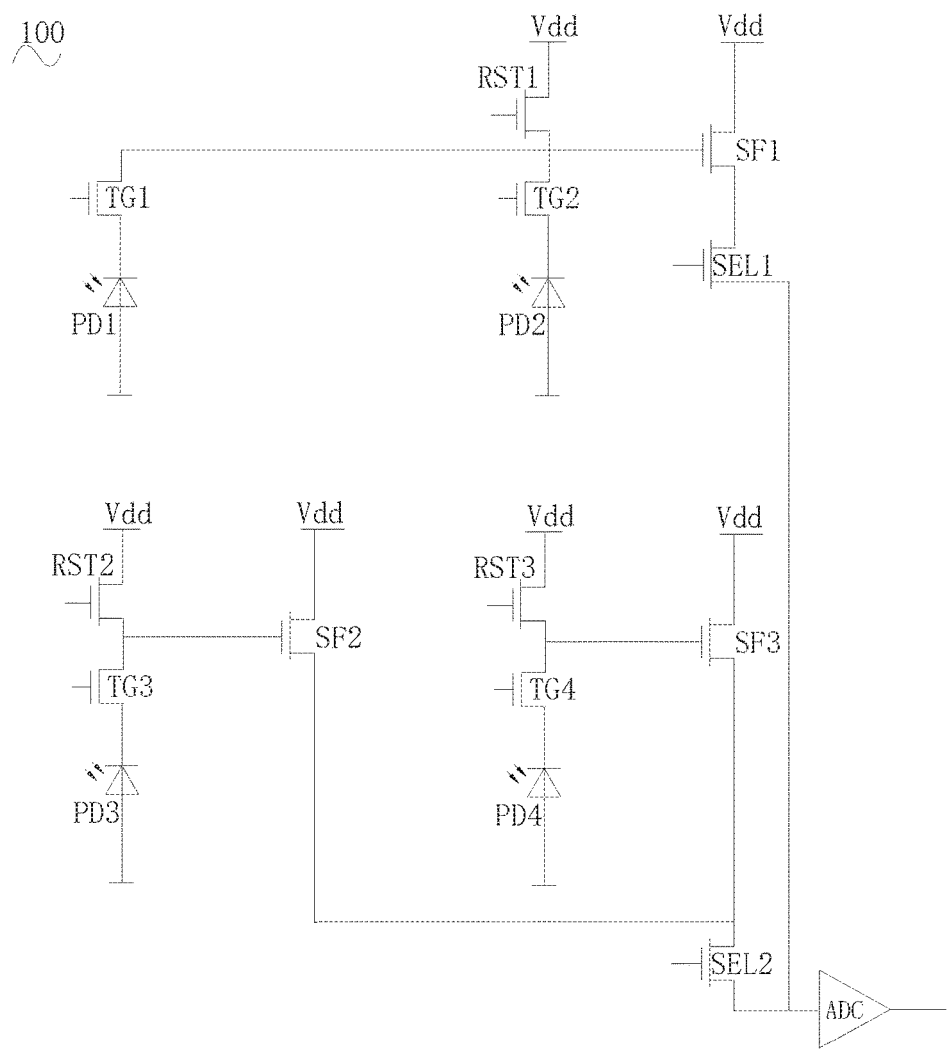
FIG. 6 illustrates a circuit diagram of the image sensor in accordance with some embodiments of the present disclosure.

Please refer to FIG. 6. In some embodiments, each of the conversion units 30 includes three source followers 31. One of the source followers 31 is connected to two light sensing pixels 22 in one row of one of the light sensing units 21. The other two of the source followers 31 are respectively connected to remaining two light sensing pixels 22 of the one of the light sensing units 21.

For example, photoinduced charges generated by the two light sensing pixels 22 in a first row are accumulated and converted into a first analog signal A1 by the one of the source followers 31. Photoinduced charges generated by the two light sensing pixels 22 in a second row are outputted by the other two of the source followers 31 and merged as a second analog signal A2.

Further, the image sensor 100 further includes a plurality of analog-to-digital conversion units 40. The three source followers 31 corresponding to each of the light sensing units are connected to one of the analog-to-digital conversion units 40. That is, each of the light sensing units 21 is connected to one of the analog-to-digital conversion units 40. The one of the analog-to-digital conversion units 40 is configured to convert the analog signals outputted by the source followers 31 into digital signals. In detail, in the present embodiment, the first analog signal A1 and the second analog signal A2 are respectively converted into a first digital signal D1 and a second digital signal D2 by the one of the analog-to-digital conversion units 40.

Further, the image sensor 100 further includes a plurality of clock switches, a plurality of reset switches, and a plurality of readout switches. The clock switches are configured to control the light sensing pixels 22 to be exposed. The reset switches are configured to reset the light sensing pixels 22. The readout switches are configured to control readouts of the light sensing pixels 22.

An equivalent circuit of one of the light sensing units 21 of the image sensor 100 is described as follows. The one of the light sensing units 21 includes light sensing pixels PD1-PD4, clock switches TG1-TG4, source followers SF1-SF3, reset switches RST1-RST3, and readout switches SEL1 and SEL2.

In detail, the light sensing pixels PD1-PD4 are arranged in a 2×2 array. The first light sensing pixel PD1, the second light sensing pixel PD2, the third light sensing pixel PD3, and the fourth light sensing pixel PD4 are adjacent light sensing pixels and correspond to the same light filtering unit 11. That is, the four adjacent light sensing pixels receive the same color of light. In brief, the four light sensing pixels constitute a large pixel. The first light sensing pixel PD1 and the second light sensing pixel PD2 are positioned in the same row, and the third light sensing pixel PD3 and the fourth light sensing pixel PD4 are positioned in the same row. Each of the light sensing pixels is connected to one of the clock switches. That is, the first light sensing pixel PD1 is connected to the first clock switch TG1. The second light sensing pixel PD2 is connected to the second clock switch TG2. The third light sensing pixel PD3 is connected to the third clock switch TG3. The fourth light sensing pixel PD4 is connected to the fourth clock switch TG4.

Further, the first light sensing pixel PD1 is connected to a first terminal of the source follower SF1 via the first clock switch TG1, and the second light sensing pixel PD2 is connected to the first terminal of the source follower SF1 via the second clock switch TG2. The first light sensing pixel PD1 is connected to a first terminal of the reset switch RST1 via the first clock switch TG1, and the second light sensing pixel PD2 is connected to the first terminal of the reset switch RST1 via the second clock switch TG2. A second terminal of the reset switch RST1 and a second terminal of the source follower SF1 are connected to a predetermined power source, e.g., Vdd. A third terminal of the source follower SF1 is connected to a first terminal of the readout switch SEL1.

Further, the third light sensing pixel PD3 is connected to a first terminal of the source follower SF2 via the third clock switch TG3, and the fourth light sensing pixel PD4 is connected to a first terminal of the source follower SF3 via the fourth clock switch TG4. The third light sensing pixel PD3 is connected to a first terminal of the reset switch RST2 via the third clock switch TG3, and the fourth light sensing pixel PD4 is connected to a first terminal of the reset switch RST3 via the fourth clock switch TG4. Second terminals of the source follower SF2, the source follower SF3, the reset switch RST2, and the reset switch RST3 are connected to the predetermined power source. Third terminals of the source follower SF2 and the source follower SF3 are connected to a first terminal of the readout switch SEL2.

Further, second terminals of the readout switches SEL1 and SEL2 are connected to one of the analog-to-digital conversion units 40.

In order to implement control of an exposure, the image sensor 100 further includes a control module. Control terminals of the first clock switch TG1, the second clock switch TG2, the third clock switch TG3, and the fourth clock switch TG4 are connected to the control module. The control module controls turned-on and turned-off of the four clock switches. When each of the four clock switches is turned on, the corresponding light sensing pixel starts to be exposed.

It is noted that before being exposed, the light sensing pixels have to be reset. That is, control terminals of the reset switches RST1-RST3 are also connected to the control module and configured to reset the corresponding light sensing pixels before the corresponding light sensing pixels are exposed or after exposing data is read.

During an exposure process, the first to fourth light sensing pixels PD1-PD4, for example, photodiodes, receive the light passing through the corresponding one of the light filtering units and generate charge. The clock switches TG1-TG4 are turned on, and the charges generated by the corresponding light sensing pixels are outputted. The charges are converted into analog signals by the source followers SF1-SF3, and the analog signals are converted into digital signals by the one of the analog-to-digital conversion unit. The digital signals are outputted for providing a data basis of image processing.

The control module controls the light sensing pixels 22 corresponding to the same one of the light filtering units 11 to be exposed synchronously row by row, and controls exposing time, so as to implement the control of the exposure. Further, the control module further controls outputs of the light sensing pixels to be read out in a time-sharing manner, thereby acquiring source material for synthesizing a high dynamic range image.

As an example, charges of two light sensing pixels (i.e., the first light sensing pixel PD1 and the second light sensing pixel PD2 corresponding to the light filtering units Gr1 and Gr2) corresponding to each of the light filtering units 11 in the (2i+1)th row (i=0, 1, 2, 3, 4, . . . ) of the light sensing array 20 are collected and converted by the source follower SF1. An output of the source follower SF1 is converted into digital signals by the one of the analog-to-digital conversion units 40 and outputted. It is assumed that an output value of the one of the analog-to-digital conversion units 40 is ADC1. Further, charges of two light sensing pixels (i.e., the third light sensing pixel PD3 and the fourth light sensing pixel PD4 corresponding to the light filtering units Gr3 and Gr4) corresponding to each of the light filtering units 11 in the (2i+1)th row (i=0, 1, 2, 3, 4, . . . ) of the light sensing array 20 adjacent to the (2i+1)th row are respectively collected and converted by the source followers SF2 and SF3. Outputs of the source followers SF2 and SF3 are converted into digital signals by the one of the analog-to-digital conversion units 40 and outputted. It is assumed that an output value of the one of the analog-to-digital conversion units 40 is ADC2.

When a photo is taken, the control module controls two adjacent rows of the light sensing units to be exposed synchronously. For example, the (2i+1)th and the (2i+2)th rows (i=0, 1, 2, 3, 4, . . . ) of the light sensing units are exposed synchronously. The exposing time is controlled to avoid that the light sensing units 22 sharing the same source follower have saturation outputs. In the embodiment of the present disclosure, an output of the source follower SF1 is approximately two times of an output of the source follower SF2 and two times of an output of the source follower SF3 (that is, SF1=2*SF2=2*SF3). The output value ADC1 is the output of the source follower SF1, and the output value ADC2 is an average value of the outputs of the source followers SF2 and SF3. That is, the four light sensing units 22 corresponding to the same light filtering unit 11 can output a high ADC value and a low ADC value synchronously. After the readout switches SEL1 and SEL2 are controlled to be turned on in a timesharing manner, the output values of the one of the analog-to-digital conversion units 40 are ADC1 (SF1=2*SF2=2*SF3) and ADC2 (AVG$_{SF2+SF3}$), thereby performing a synthetic processing using an image processor to acquire a high dynamic range image. That is, based on hardware structure of the image sensor 100, the high output and the low output of the one of the analog-to-digital conversion units provide conditions for the synthesis of the high dynamic range image.

Figure 7:
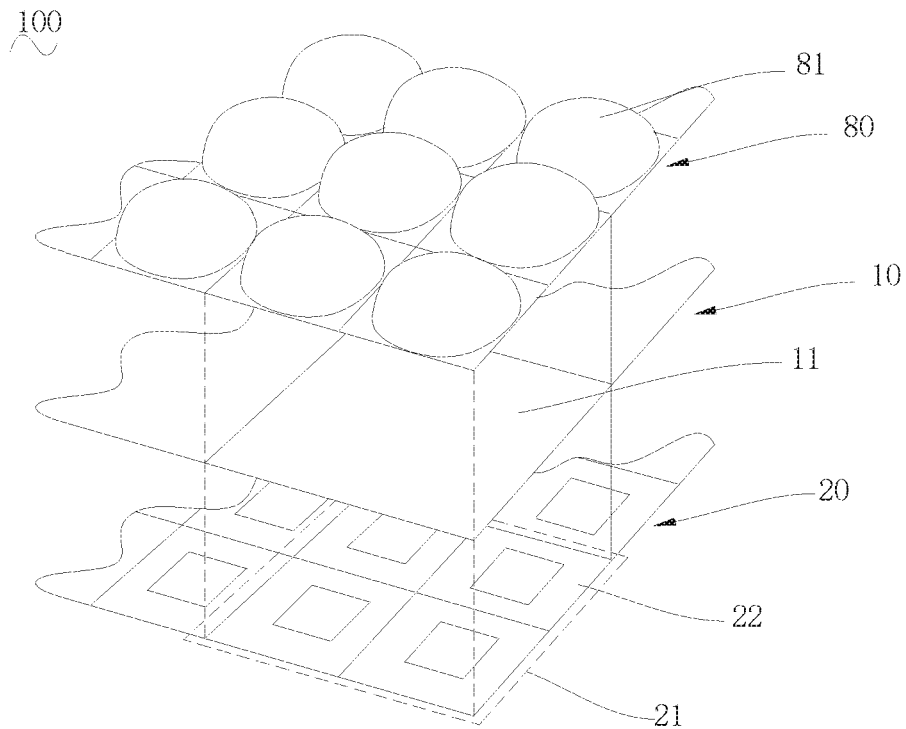
FIG. 7 illustrates a structural diagram of the image sensor in accordance with some embodiments of the present disclosure.

Please refer to FIG. 7. The image sensor 100 further includes a micromirror array 80 disposed on the light filtering array 10. The micromirror array 80 includes a plurality of micromirrors 81. Each of the micromirrors 81 in the micromirror array 80 corresponds to one of the light sensing pixels 22. The correspondence includes formation, size, and position. The micromirrors 81 can guide light to light sensing parts of the light sensing pixels 22 to enhance light receiving intensity of the light sensing pixels 22, thereby improving imaging quality.

Based on the image sensors in the above-mentioned embodiments, a control method in accordance with an embodiment of the present disclosure is described in conjunction with the appended drawings.

Figure 8:
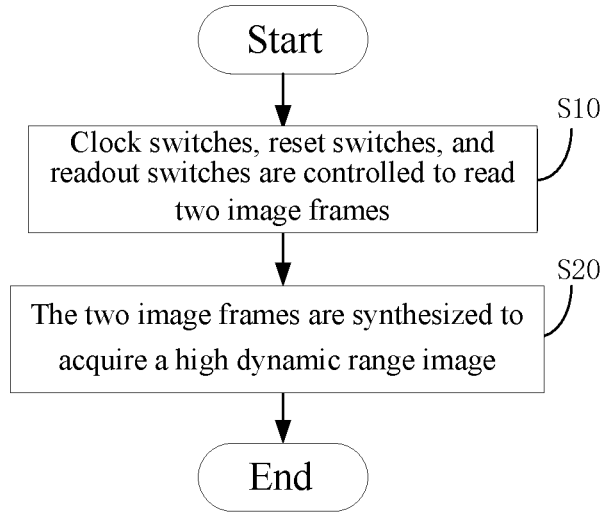
FIG. 8 illustrates a flowchart of a control method in accordance with an embodiment of the present disclosure.

Please refer to FIG. 8. The control method includes the following operations.

At block S10, clock switches, reset switches, and readout switches are controlled to read two image frames.

At block S20, the two image frames are synthesized to acquire a high dynamic range image.

As the above-mentioned description of the image sensors in the embodiments, the high dynamic range image can be synthesized based on hardware structure of one of the image sensors.

In an imaging method in accordance with an embodiment of the present disclosure, it is assumed that an output of each of the light sensing pixels is S, noise is N, and a merged pixel includes M light sensing pixels. Accordingly, a pixel value of the merged pixel is n*m*S, and noise of the merged pixel is $$\frac{\sqrt{n*m*N^2}}{n*m}.$$

When n=2 and m=2, the noise of the merged pixel is approximate n*m*N/2. As such, brightness of the merged pixel is increased in a low brightness environment, and a signal-to-noise ratio is increased.

Figure 9:
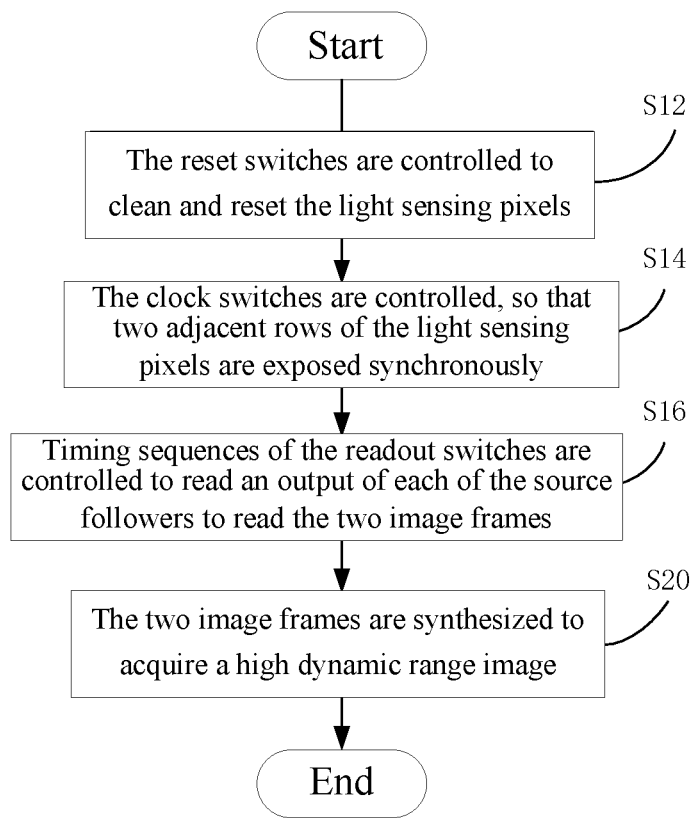
FIG. 9 illustrates a flowchart of the control method in accordance with some embodiments of the present disclosure.

Please refer to FIG. 9. In some embodiments, block S10 includes the following operations.

At block S12, the reset switches are controlled to reset the light sensing pixels.

At block S14, the clock switches are controlled, so that two adjacent rows of the light sensing pixels are exposed synchronously.

At block S16, timing sequences of the readout switches are controlled to read an output of each of the source followers to read the two image frames.

As such, source material for synthesizing the high dynamic range image can acquire by controlling the exposure and the time sequences.

In some embodiments, block S10 further includes converting analog signals outputted by the source followers into digital signals.

As such, an image processing module served as a chip for processing digital signals can directly process the output of the image sensor.

Based on the image sensors in the above-mentioned embodiments, an electronic device in accordance with an embodiment of the present disclosure is described in conjunction with the appended drawings.

Figure 10:
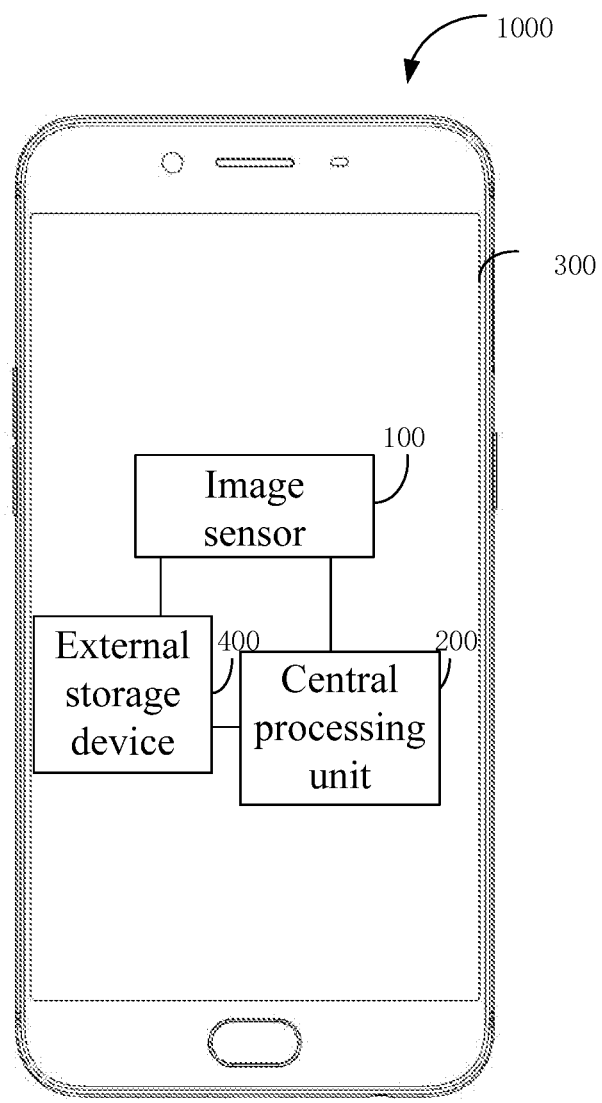
FIG. 10 illustrates a functional block diagram of an electronic device in accordance with some embodiments of the present disclosure.

Please refer to FIG. 10. The electronic device 1000 includes one of the above-mentioned image sensors 100. In detail, the electronic device 1000 may include a mobile phone or a tablet computer.

In some embodiments, the electronic device 1000 further includes a central processing unit 200 connected to the image sensor 100 and a display device 300. The central processing unit 200 is configured to control the display device 300 to display an image outputted by the image sensor 100. Accordingly, an image captured by the electronic device 1000 can be displayed in the display device 300 for a user to see. The display device 300 includes an LED display.

In some embodiments, the electronic device 1000 further includes a central processing unit 200 connected to the image sensor 100 and an external storage device 400. The central processing unit 200 is configured to control the external storage device 400 to store an image outputted by the image sensor 100.

As such, generated images can be stored, so that they can be seen, used, or transferred conveniently. For example, the external storage device 400 includes a secure digital (SD) card or a compact flash (CF) card.

The electronic device 1000 which uses the image sensor 100 not only can increase the sensitivity and the signal-to-noise ratio based on the hardware structure of the image sensor 100 when a photo is taken, but also can implement a function of synthesizing a high dynamic range image to improve photographing experience.

Figure 11:
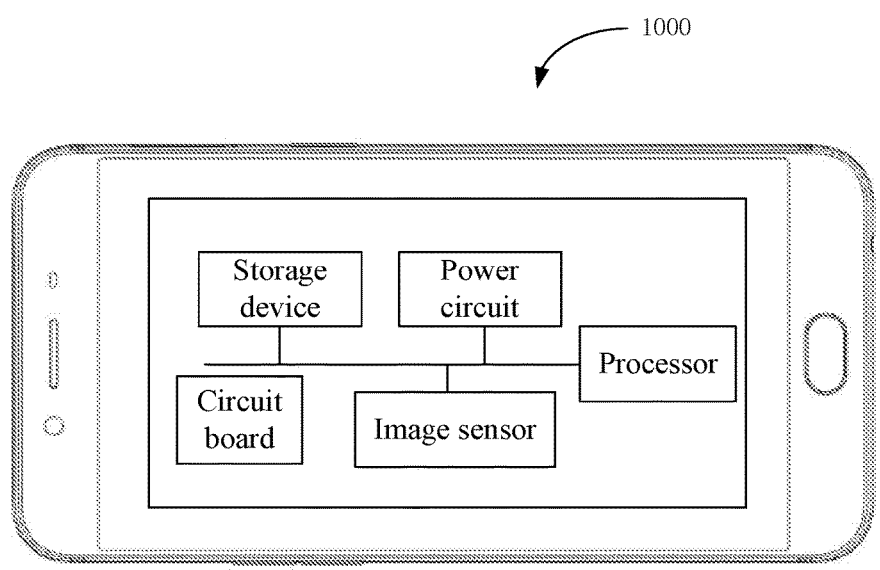
FIG. 11 illustrates a functional block diagram of an electronic device in accordance with some embodiments of the present disclosure.

Please refer to FIG. 11, an embodiment of the present disclosure further provides an electronic device. The electronic device includes a case, a processor, a storage device, a circuit board, and a power circuit. The circuit board is disposed in a space surrounded by the case. The processor and the storage device are disposed on the circuit board. The power circuit is configured to providing power for each circuit and each device of the electronic device. The storage device is configured to store executable program codes. The processor executes programs corresponding to the executable program codes to perform the above-mentioned control methods.

An embodiment of the present disclosure further provides a computer readable storage medium stored with instructions. When a processor of an electronic device executes the instructions, the electronic device performs the control methods in accordance with the embodiments of the present disclosure as shown in the drawings.

It should be explained that, relation and relative terms used herein, such as the first and the second, are only used for distinguishing one entity or operation from another entity or operation, and it is not required or suggested to necessarily have any of the practical relations or sequence between the entities or operations. Furthermore, the terms "comprise", "include" or any other variants aim to be non-exclusive, so that not only a series of elements such as the process, method, article or device included, but also other elements unlisted are included. Furthermore, the inherent elements of the process, method, article or device are included. Under the condition without more limitation, the elements limited by the sentence "comprises a . . . " are non-exclusive to additional same elements besides the process, method, article or device of the elements.

The logic and/or step described in other manners herein or shown in the flowchart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It is noted that in the description of the specification, reference terminologies "an embodiment", "some embodiments", "an illustrate embodiment", "an example", "a specific example", or "some examples", "some embodiments", "some embodiments", "some embodiments", or "some embodiments" mean that specific features, structures, materials, or characteristics in conjunction with the description of the embodiments or examples are included in at least one of the embodiments or examples. In the specification, the illustrated description of the above-mentioned terminologies is not limited to the same embodiment or example. Moreover, the described specific features, structures, materials, or characteristics may be combined in a proper way in any one or more of the embodiments or examples.

In the description of the specification, reference terminologies "an embodiment", "some embodiments", "an illustrate embodiment", "an example", "a specific example", or "some examples", "some embodiments", "some embodiments", "some embodiments", or "some embodiments" mean that specific features, structures, materials, or characteristics in conjunction with the description of the embodiments or examples are included in at least one of the embodiments or examples. In the specification, the illustrated description of the above-mentioned terminologies is not limited to the same embodiment or example. Moreover, the described specific features, structures, materials, or characteristics may be combined in a proper way in any one or more of the embodiments or examples.

While the embodiments of the present disclosure have been shown and described, it will be understood that the above-mentioned embodiments are merely exemplary and not to be construed as limiting the present disclosure. Those skilled in the art can make various changes, modifications, equivalents, and variants without departing from the spirit and scope of the present disclosure.

What is claimed is:

1. An image sensor, comprising:
a light sensing array comprising a plurality of light sensing units, wherein each of the light sensing units comprises a plurality of light sensing pixels;
a light filtering array disposed on the light sensing array, wherein the light filtering array comprises a plurality of light filtering units, and each of the light filtering units correspondingly covers one of the light sensing units; and
a plurality of conversion units, wherein each of the conversion units comprises at least two source followers, and at least one of the at least two source followers is connected to a plurality of the light sensing pixels;
wherein when each of the conversion units comprises two source followers, one of the source followers is connected to at least three of the light sensing pixels;
wherein when each of the conversion units comprises at least three source followers, one of the at least three source followers is connected to at least two of the light sensing pixels.

2. The image sensor of claim 1, wherein each of the light sensing units comprises 2×2 light sensing pixels.

3. The image sensor of claim 2, wherein each of the conversion units comprises two source followers, one of the source followers is connected to three of the light sensing pixels, and the other one of the source followers is connected to a remaining one of the light sensing pixels.

4. The image sensor of claim 3, further comprising a plurality of analog-to-digital conversion units, and each of the analog-to-digital conversion units is connected to one of the source followers.

5. The image sensor of claim 3, further comprising:
a plurality of clock switches, wherein each of the clock switches is connected to one of the light sensing pixels;
a plurality of reset switches, wherein the three of the light sensing pixels to which the one of the source followers is connected are connected to one of the reset switches, and the remaining one of the light sensing pixels to which the other one of the source followers is connected is connected to the other one of the reset switches; and
a plurality of readout switches, wherein the one of the source followers connected to the three of the light sensing pixels is connected to one of the readout switches, and the other one of the source followers connected to the remaining one of the light sensing pixels is connected to the other one of the readout switches.

6. The image sensor of claim 2, wherein each of the conversion units comprises three source followers, one of the source followers is connected to two of the light sensing pixels in one column, and the other two of the source followers are respectively connected to remaining two of the light sensing pixels.

7. The image sensor of claim 6, further comprising a plurality of analog-to-digital conversion units, the source follower connected to the two of the light sensing unit in the one column is connected to one of the analog-to-digital conversion units, and the two source follower respectively connected to the remaining two of the light sensing units are connected to the other one of the analog-to-digital conversion units.

8. The image sensor of claim 6, further comprising:
a plurality of clock switches, wherein each of the clock switches is connected to one of the light sensing pixels;
a plurality of reset switches, wherein the two of the light sensing pixels in the one column to which the one of the source followers is connected are connected to one of the reset switches, and the remaining two of the light sensing pixels are connected to respective ones of the reset switches; and
a plurality of readout switches, wherein the one of the source followers connected to the two of the light sensing pixels in the one column is connected to one of the readout switches, and the other two of the source followers respectively connected to the remaining two of the light sensing pixels are connected to the other one of the readout switches.

9. The image sensor of claim 2, wherein each of the conversion units comprises three source followers, one of the source followers is connected to two of the light sensing pixels in one row, and the other two of the source followers are respectively connected to remaining two of the light sensing pixels.

10. The image sensor of claim 9, further comprising a plurality of analog-to-digital conversion units, and one of the analog-to-digital conversion units is connected to the three source followers.

11. The image sensor of claim 9, further comprising:
a plurality of clock switches, wherein each of the clock switches is connected to one of the light sensing pixels;
a plurality of reset switches, wherein the two of the light sensing pixels in the one row to which the one of the source followers is connected are connected to one of the reset switches, and the other two of the light sensing pixels are connected to respective ones of the reset switches; and
a plurality of readout switches, wherein the one of the source followers connected to the two of the light sensing pixels in the one row is connected to one of the readout switches, and the other two of the source followers connected to the other two of the light sensing pixels is connected to the other one of the readout switches.

12. A control method configured to control an image sensor, wherein the image sensor comprises a light sensing array, a light filtering array, and a plurality of conversion units, the light sensing array comprises a plurality of light sensing units, each of the light sensing units comprises a plurality of light sensing pixels, the light filtering array is disposed on the light sensing array, the light filtering array comprises a plurality of light filtering units, each of the light filtering units correspondingly covers one of the light sensing units, each of the light sensing units comprises a plurality of light sensing pixels, at least one of the at least two source followers is connected to a plurality of the light sensing pixels, each of the light sensing units comprises 2×2 light sensing pixels, one of the source followers being connected to at least three of the light sensing pixels when each of the conversion units comprises two source followers, and one of the at least three source followers being connected to at least two of the light sensing pixels when each of the conversion units comprises at least three source followers, the image sensor further comprises a plurality of clock switches configured to control the light sensing pixels to be exposed, a plurality of reset switches configured to reset the light sensing pixels, and a plurality of readout switches configured to control readouts of the light sensing pixels, and the control method comprises:
controlling the clock switches, the reset switches, and the readout switches to read two image frames; and synthesizing the two image frames to acquire a high dynamic range image.

13. The control method of claim 12, wherein controlling the clock switches, the reset switches, and the readout switches to read the two image frames comprises:
controlling the reset switches to reset the light sensing pixels;
controlling the clock switches, so that two adjacent rows of the light sensing pixels are exposed synchronously; and
controlling timing sequences of the readout switches to read an output of each of the source followers to read the two image frames.

14. The control method of claim 13, wherein controlling the clock switches, the reset switches, and the readout switches to read the two image frames comprises:
converting analog signals outputted by the source followers into digital signals.

15. An electronic device, comprising an image sensor, wherein the image sensor comprises:
a light sensing array comprising a plurality of light sensing units, wherein each of the light sensing units comprises a plurality of light sensing pixels;
a light filtering array disposed on the light sensing array, wherein the light filtering array comprises a plurality of light filtering units, and each of the light filtering units correspondingly covers one of the light sensing units;
a micromirror array disposed on the light filtering array and comprising a plurality of micromirrors, wherein each of the micromirrors corresponds to one of the light sensing pixels; and
a plurality of conversion units, wherein each of the conversion units comprises at least two source followers, and at least one of the at least two source followers is connected to a plurality of the light sensing pixels;
wherein when each of the conversion units comprises two source followers, one of the source followers is connected to at least three of the light sensing pixels,
wherein when each of the conversion units comprises at least three source followers, one of the at least three source followers is connected to at least two of the light sensing pixels.

16. The electronic device of claim 15, further comprising a central processing unit connected to the image sensor and an external storage device, and the central processing unit is configured to control the external storage device to store an image outputted by the image sensor.

17. The electronic device of claim 15, further comprising a central processing unit connected to the image sensor and a display device, and the central processing unit is configured to control the display device to display an image outputted by the image sensor.

* * * * *